(12) United States Patent
Hsu

(10) Patent No.: US 12,498,630 B2
(45) Date of Patent: Dec. 16, 2025

(54) BEAM SPLITTING ELEMENT AND PROJECTION DEVICE

(71) Applicant: Coretronic Corporation, Hsin-Chu (TW)

(72) Inventor: Pi-Tsung Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 657 days.

(21) Appl. No.: 17/862,418

(22) Filed: Jul. 12, 2022

(65) Prior Publication Data

US 2023/0027535 A1 Jan. 26, 2023

(30) Foreign Application Priority Data

Jul. 26, 2021 (CN) .......................... 202121697352.9

(51) Int. Cl.
*G03B 21/20* (2006.01)
*G02B 5/02* (2006.01)
*G02B 27/14* (2006.01)

(52) U.S. Cl.
CPC .......... *G03B 21/2073* (2013.01); *G02B 5/021* (2013.01); *G02B 5/0284* (2013.01); *G02B 5/0294* (2013.01); *G02B 27/144* (2013.01); *G03B 21/204* (2013.01)

(58) Field of Classification Search
CPC .. G03B 21/204; G03B 21/2073; G03B 21/20; G03B 21/2066; G03B 21/208; G02B 5/0284; G02B 5/0294; G02B 27/144; G02B 5/021
See application file for complete search history.

(56) References Cited

U.S. PATENT DOCUMENTS

2021/0325769 A1* 10/2021 Guo ................... G03B 21/2066

FOREIGN PATENT DOCUMENTS

| CN | 103912848 | | 7/2014 | |
|---|---|---|---|---|
| CN | 111856863 | | 10/2020 | |
| CN | 211976648 | U * | 11/2020 | ............... F21S 8/00 |

* cited by examiner

*Primary Examiner* — Ryan D Howard
(74) *Attorney, Agent, or Firm* — JCIPRNET

(57) ABSTRACT

A beam splitting element as provided includes an optical substrate and a diffuse reflection layer. The optical substrate is configured to reflect or allow the incident beam to pass through. The diffuse reflection layer is disposed on a portion of a surface of the optical substrate. The incident beam is split into first and second split beams through the beam splitting element and satisfies one of the following conditions: field angles of the first and second split beams exit from the beam splitting element are different; the field angles of the first and second split beams exit from the beam splitting element are the same, and exit directions of the first and second split beams are parallel to each other. A projection device having the beam splitting element is also provided.

19 Claims, 12 Drawing Sheets

BEAM SPLITTING ELEMENT AND PROJECTION DEVICE

CROSS-REFERENCE TO RELATED APPLICATION

This application claims the priority benefit of China application serial no. 202121697352.9, filed on Jul. 26, 2021. The entirety of the above-mentioned patent application is hereby incorporated by reference herein and made a part of this specification.

BACKGROUND

Technical Field

The invention relates to a beam splitting element and a projection device.

Description of Related Art

The structures of conventional wavelength conversion elements (e.g. a phosphor wheel) of projection devices may be divided into the o-ring type (with a complete ring-shaped wavelength conversion layer on the wavelength conversion element) and the fan type (with a non-wavelength conversion layer on the wavelength conversion element). The fan type of the wavelength conversion elements may be divided into a transmission type without glass (with a hole on a substrate for direct transmission), a reflection type without glass (with a reflection film or reflection material coated on a substrate), a transmission type with glass (with an anti-reflection film coated on glass), and a reflection type with glass (with a high-reflection film coated on glass). Currently, the reflection type with glass and the reflection type without glass are the two most widely used structures of the wavelength conversion elements in the industry.

Regarding the two most widely used structures of the wavelength conversion elements, with the reflection type with glass, almost over 90% of the incident beam enters the light path system of the projection device through mirror reflection, and the light which is not reflected is absorbed by a substrate, whereas with the reflection type without glass, almost over 90% of the incident beam enters the light path system of the projection device through diffuse reflection, and the light which is not reflected is absorbed by a substrate and a diffuse reflection coating layer. As for the transmission type without glass, the incident beam may directly pass through a hole or anti-reflection glass to the light path of the projection device at the back of a substrate. However, the following is recognized in the conventional structures of the wavelength conversion elements of the projection devices.

1. If the incident beam designed by the projection device has to be split (e.g. after directly passing through the hole on the substrate, the incident beam is split into two mirror reflection beams or one mirror reflection beam and one diffuse reflection beam), another beam splitter of the projection device is required for beam splitting. Hence, the projection device becomes more complicated.

2. If the projection device needs diffuse reflection and mirror reflection beams, a reflector capable of mirror reflection and diffuse reflection is required to generate the diffuse reflection and mirror reflection beams. Hence, the projection device becomes more complicated.

3. If the projection device needs diffuse reflection and mirror reflection beams at different ratios, generally, after a beam is split through a coated beam splitter (the beam is split into two mirror reflection beams), diffused light is generated through a transmissive diffuser or a reflective diffuse reflector from one of the beams and enters the light path of the projection device. The light path of such projection device is highly complicated, which leads to a high manufacturing cost and a great volume of the projection device.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a beam splitting element which splits a beam.

The invention provides a projection device adopting the beam splitting element capable of simplifying the light path of the projection device and further reducing the volume of the projection device.

An embodiment of the invention provides a beam splitting element which is configured to split an incident beam incident to the beam splitting element. The beam splitting element includes an optical substrate and a diffuse reflection layer. The optical substrate is configured to allow the incident beam to reflect or pass through. The diffuse reflection layer is disposed on a portion of a surface of the optical substrate. The incident beam is split into a first split beam and a second split beam through the beam splitting element and satisfies one of the following conditions: an field angle of the first split beam and an field angle of the second split beam after the first split beam and the second split beam exit from the beam splitting element are different; the field angle of the first split beam and the field angle of the second split beam after the first split beam and the second split beam exit from the beam splitting element are the same, and an exit direction of the first split beam and an exit direction of the second split beam are parallel to each other.

An embodiment of the invention provides a projection device including an illumination system, a light valve, and a projection lens. The illumination system is configured to provide an illuminating beam. The light valve is disposed on a transmission path of the illuminating beam and is configured to convert the illuminating beam into an image beam. The projection lens is disposed on a transmission path of the image beam and is configured to project the image beam out of the projection device. The illumination system includes a light source, a beam splitting element, a wavelength conversion element, and a light homogenization element. The light source is configured to emit an incident beam. The beam splitting element includes an optical substrate and a diffuse reflection layer. The optical substrate is configured to reflect or allow the incident beam to pass through. The diffuse reflection layer is disposed on a portion of a surface of the optical substrate. The incident beam is split into a first split beam and a second split beam through the beam splitting element and satisfies one of the following conditions: an field angle of the first split beam and an field angle of the second split beam after the first split beam and the second split beam exit from the beam splitting element are different; the field angle of the first split beam and the field angle of the second split beam after the first split beam and the second split beam exit from the beam splitting element are the same, and an exit direction of the first split beam and an exit direction of the second split beam are parallel to each other. The first split beam or the incident beam is converted into a converted beam through the wavelength conversion element and then enters the light homogenization element so that the illumination system outputs a first color light in the illuminating beam.

Based on the above, in the embodiments of the invention, the beam splitting element is simply designed to split a beam by using the optical substrate and the diffuse reflection layer. Therefore, with the beam splitting element, a manufacturing cost of the projection device and a space of the projection device can be effectively reduced. At the same time, additional optical elements such as a beam splitter or a diffuser are not required in the projection device adopting the beam splitting element. The light path of the illumination system can be simplified, and the diffuse reflection light effect also increases the uniformity of a projection image.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
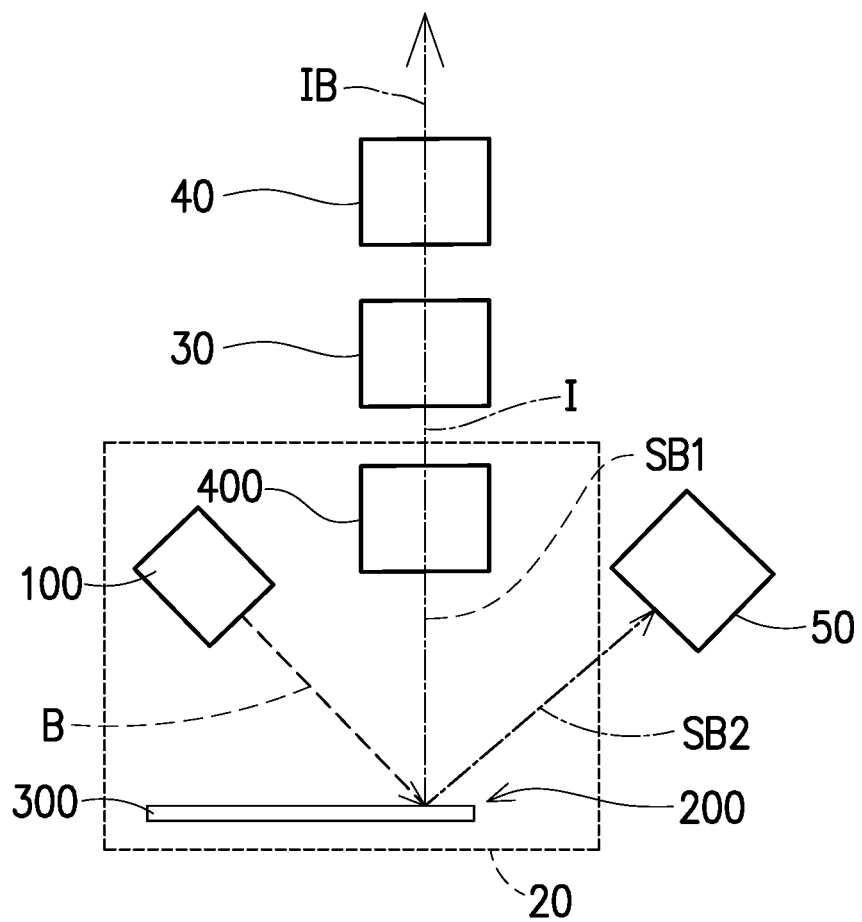
FIG. 1A is a schematic diagram of a projection device according to a first embodiment of the invention.
Figure 1B:
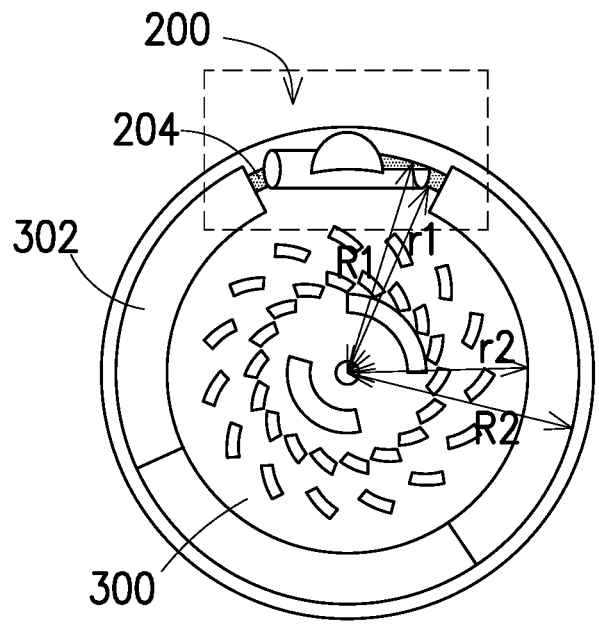
FIG. 1B is a schematic diagram of a wavelength conversion element and a beam splitting element in FIG. 1A.
Figure 1C:
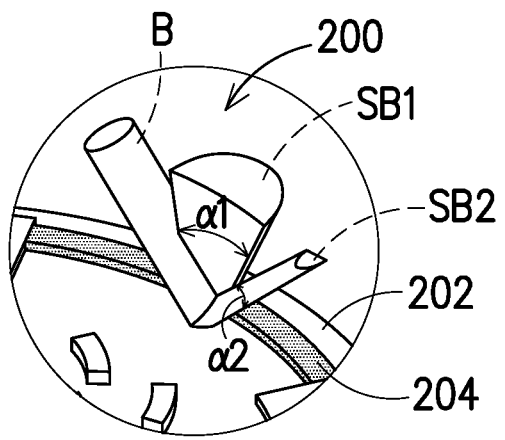
FIG. 1C is an enlarged schematic diagram of the beam splitting element in FIG. 1B.

FIG. 1A is a schematic diagram of a projection device according to a first embodiment of the invention. FIG. 1B is a schematic diagram of a wavelength conversion element and a beam splitting element in FIG. 1A. FIG. 1C is an enlarged schematic diagram of the beam splitting element in FIG. 1B. Referring to FIG. 1A, FIG. 1B, and FIG. 1C, an embodiment of the invention provides a projection device 10 including an illumination system 20, a light valve 30, and a projection lens 40. The illumination system 20 is configured to provide an illuminating beam I. The light valve 30 is disposed on a transmission path of the illuminating beam I and is configured to convert the illuminating beam I into an image beam IB. The projection lens 40 is disposed on a transmission path of the image beam IB and is configured to project the image beam IB out of the projection device 10 to a projection target (not shown), such as a screen or a wall surface.

Specifically, the light valve 30 of the embodiment is, for example, a spatial light modulator such as a digital micromirror device (DMD), a liquid-crystal-on-silicon panel (LCOS Panel), or a liquid crystal panel (LCD). In addition, the projection lens 40 includes, for example, a combination of one or multiple optical lenses with refractive power. The optical lenses include, for example, various combinations of non-planar lenses such as a biconcave lens, a biconvex lens, a concave-convex lens, a convex-concave lens, a plano-convex lens, a plano-concave lens, etc. The invention is not intended to limit the types and forms of the projection lens 40.

In the embodiment, the illumination system 20 includes a light source 100, a beam splitting element 200, a wavelength conversion element 300, and a light homogenization element 400. The light source 100 is configured to emit an incident beam B. The light source 100 is, for example, a laser diode (LD), a light emitting diode (LED), or other suitable light sources or the combinations thereof. The invention is not particularly limited in this regard. In addition, the incident beam B may be an ultraviolet beam, a blue beam, a red beam, a green beam, or a beam with other colors. The light homogenization element 400 is, for example, an integration rod, a lens array, or other optical elements having a light homogenization effect; however, the invention is not limited thereto.

Figure 3A:
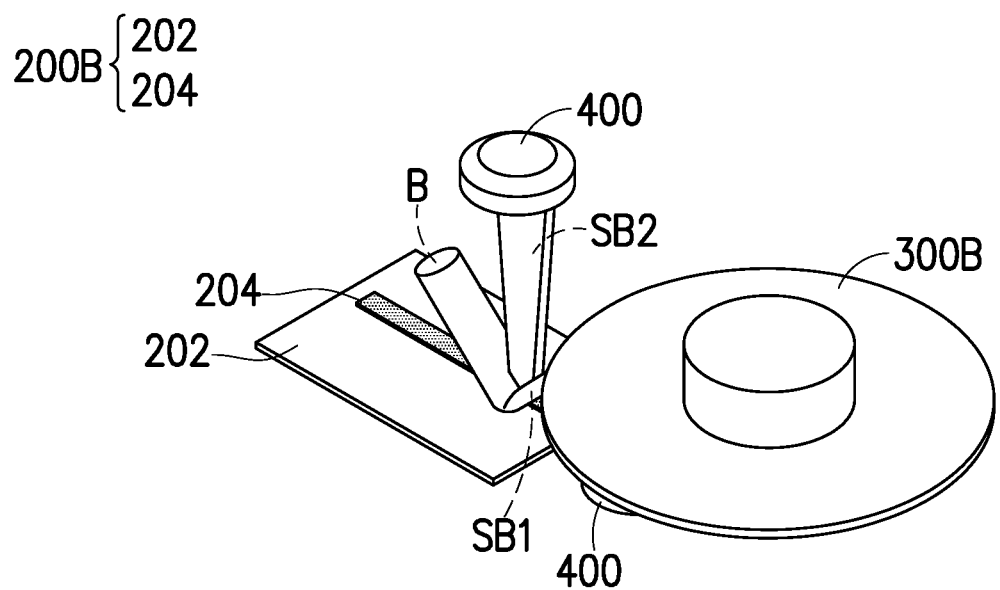
FIG. 3A is a schematic diagram of a wavelength conversion element and a beam splitting element according to a third embodiment of the invention.
Figure 3B:
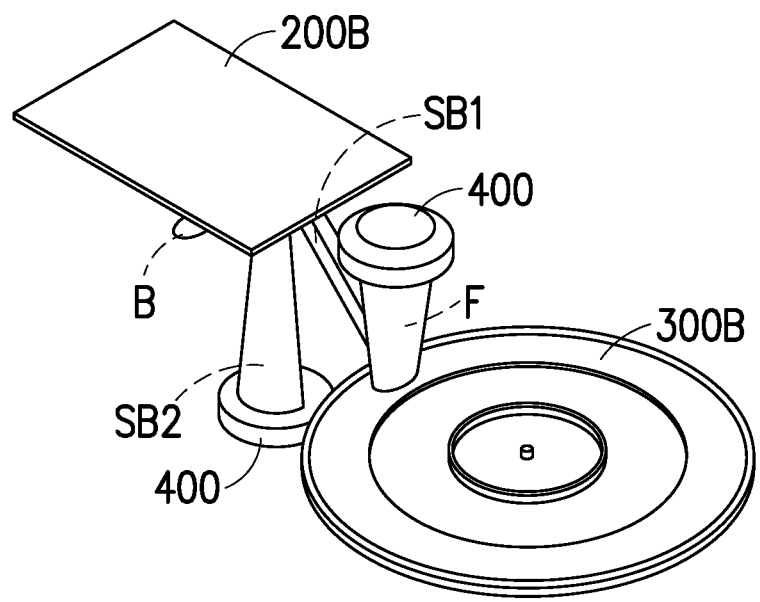
FIG. 3B is a schematic diagram of FIG. 3A viewed from another perspective.

In the embodiment, the wavelength conversion element 300 is, for example, an optical wheel and includes a wavelength conversion layer 302 configured to generate a converted beam (e.g. a converted beam F in FIG. 3B). In addition, the beam splitting element 200 is disposed on the wavelength conversion element 300. The beam splitting element 200 includes an optical substrate 202 and a diffuse reflection layer 204. The optical substrate 202 is configured to reflect or allow the incident beam B to pass through. In the embodiment, the optical substrate 202 is a mirror reflection substrate, and the diffuse reflection layer 204 is disposed on a portion of a surface of the optical substrate 202. The optical substrate 202 is, for example, a substrate including metal, polymers, or ceramic or a substrate coated with a mirror reflection film (e.g. a dielectric material, a metal material, etc.). A material of the diffuse reflection layer 204 may be diffuse reflection particles such as aluminium oxide ($Al_2O_3$), titanium dioxide ($TiO_2$), phosphor powder, and the like or a mixture thereof.

In addition, the incident beam B is split into a first split beam SB1 and a second split beam SB2 through the beam splitting element 200 and satisfies one of the following conditions: field angles $\alpha 1$ and $\alpha 2$ after the first split beam SB1 and the second split beam SB2 exit from the beam splitting element 200 are different; the field angles $\alpha 1$ and $\alpha 2$ after the first split beam SB1 and the second split beam SB2 exit from the beam splitting element 200 are the same, and the exit directions of the first split beam SB1 and the second split beam SB2 are parallel to each other. In the embodiment, the first split beam SB1 and the second split beam SB2 satisfy the condition that the field angles $\alpha 1$ and $\alpha 2$ after the first split beam SB1 and the second split beam SB2 exit from the beam splitting element 200 are different, and the embodiment further satisfies that the field angle $\alpha 2$ of the second split beam SB2 and an field angle of the incident beam B are the same.

In the embodiment, the first split beam SB1 or the incident beam B is converted into the converted beam (e.g. the converted beam F in FIG. 3B) through the wavelength conversion element 300 and then enters the light homogenization element 400 so that the illumination system 20 outputs a first color light in the illuminating beam I. In addition, the projection device 10 further includes an optical system 50. Specifically, the exit directions of the first split beam SB1 and the second split beam SB2 from the beam splitting element 200 are different. In a first timing, the wavelength conversion element 300 rotates, and the wavelength conversion layer 302 cuts into a transmission path of the incident beam B. The incident beam B is converted into the converted beam through the wavelength conversion element 300 so that the illumination system 20 outputs the first color light in the illuminating beam I. For example, when the incident beam B is a blue light, the first color light may be a yellow light, a red light, a green light, or a light with other colors.

In a second timing of the embodiment, the wavelength conversion element 300 rotates, and the beam splitting element 200 cuts into the transmission path of the incident beam B. A light speckle range of the incident beam B incident to the beam splitting element 200 includes a first portion falling on the diffuse reflection layer 204 as well as a second portion falling on the optical substrate 202 without the diffuse reflection layer 204 so that the incident beam B is correspondingly split into the first split beam SB1 and the second split beam SB2. The first split beam SB1 enters the light homogenization element 400 so that the illumination system 20 outputs a second color light in the illuminating beam I. The second split beam SB2 is transmitted to the optical system 50. The light color of the second color light is the same as the light color of the incident beam B.

In the embodiment, a light intensity ratio of the first split beam SB1 to the second split beam SB2 is proportional to a ratio of the first portion of the diffuse reflection layer 204 to the second portion of the optical substrate 202. That is, the light intensity ratio of the first split beam SB1 to the second split beam SB2 is determined by designing a ratio of the light speckle range of the incident beam B incident to the beam splitting element 200 to a range of the diffuse reflection layer 204. For example, a width of the diffuse reflection layer 204 which is perpendicular to a radius of the wavelength conversion element 300 is 50% of a width of the light speckle of the incident beam B, a ratio of the first portion of the diffuse reflection layer 204 to the second portion of the optical substrate 202 is 1:1, and after the incident beam B is split, the first split beam SB1 with 50% light intensity which is diffusely reflected and the second split beam SB2 with 50% light intensity which is mirror reflected are formed. In addition, parameters of the diffuse reflection layer 204, such as an appearance, a thickness, a density, or a concentration, may be adjusted according to the actual use, and the invention is not particularly limited by the parameters.

In the embodiment, the wavelength conversion layer 302 and the diffuse reflection layer 204 are connected to form a ring shape taking a center of the wavelength conversion element 300 as a circle center. The wavelength conversion layer 302 and the diffuse reflection layer 204 are disposed on portions of the surface of the optical substrate 202. That is, in the embodiment, the wavelength conversion element 300 and the beam splitting element 200 are integrated through the optical substrate 202. In the embodiment, a difference between an outer radius R2 and an inner radius r2 of the wavelength conversion layer 302 is greater than a difference between an outer radius R1 and an inner radius r1 of the diffuse reflection layer 204.

Based on the above, in the embodiment of the invention, the beam splitting element 200 is designed to split a beam as desired by adjusting a ratio of the optical substrate 202 to the diffuse reflection layer 204. Therefore, the incident beam B is split as well as diffused by using the beam splitting element 200. Hence, a manufacturing cost and a system space of the projection device 10 can be effectively reduced. In addition, the beam splitting element 200 may be simply integrated with the wavelength conversion element 300. Therefore, additional optical elements such as a beam splitter or a diffuser are not required in the projection device 10 adopting the beam splitting element 200. The light path of the illumination system 20 can be simplified, and the volume of the projection device 10 can be reduced by at least 5% to 20%. Apart from the effectively reduced manufacturing cost and system space, the diffuse reflection of the light beam by the projection device 10 also increases the uniformity of a projection image.

In addition, in an embodiment, the second split beam SB2 (or the first split beam SB1 in other embodiments) which does not directly enter the light valve 30 may be transmitted to the optical system 50. The optical system 50 may be another set of a light valve and a projection lens; however, the invention is not limited thereto. Therefore, the second split beam SB2 may generate a projection image which is different from that generated by the first split beam SB1 through the optical system 50.

Figure 2A:
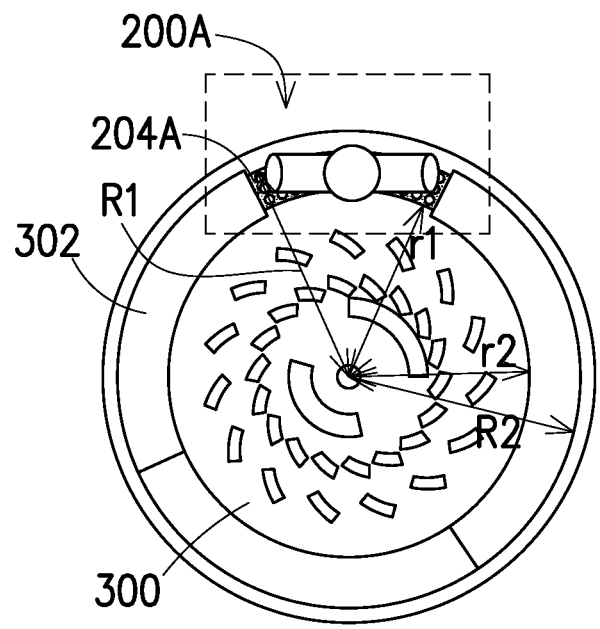
FIG. 2A is a schematic diagram of a wavelength conversion element and a beam splitting element according to a second embodiment of the invention.
Figure 2B:
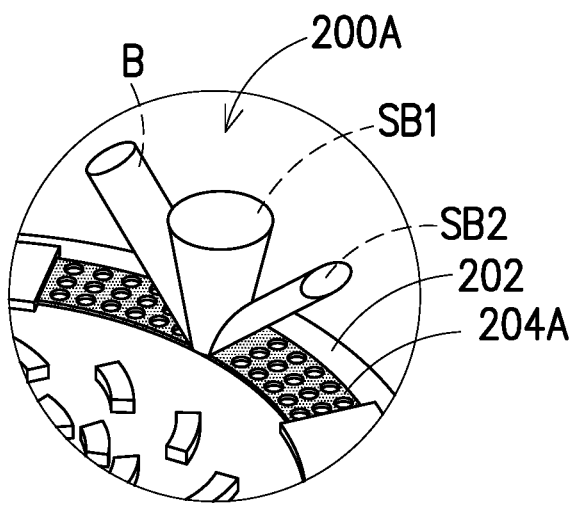
FIG. 2B is an enlarged schematic diagram of the beam splitting element in FIG. 2A.

FIG. 2A is a schematic diagram of a wavelength conversion element and a beam splitting element according to a second embodiment of the invention. FIG. 2B is an enlarged schematic diagram of the beam splitting element in FIG. 2A. Referring to FIGS. 2A and 2B, a beam splitting element 200A of the embodiment and the beam splitting element 200 in FIG. 1C are similar. The major difference is that in the embodiment, a diffuse reflection layer 204A of the beam splitting element 200A may include multiple regions which are separately distributed. For example, the diffuse reflection layer 204A may include multiple regions separated by multiple hollow dotted arrays. However, in another embodiment, the diffuse reflection layer 204A may also include multiple separate dotted arrays. Furthermore, in a light speckle range of the incident beam B incident to the beam splitting element 200A, a range of a first portion of the diffuse reflection layer 204A is substantially the same as a range of the second portion of the optical substrate 202. The light speckle range may be adjusted according to the actual use, and the invention is not limited thereto. The advantages of the beam splitting element 200A of the embodiment or a projection device adopting the beam splitting element 200A are similar to the advantages of the beam splitting element 200 or the projection device 10 in FIG. 1A and will not be repeated here.

FIG. 3A is a schematic diagram of a wavelength conversion element and a beam splitting element according to a third embodiment of the invention. FIG. 3B is a schematic diagram of FIG. 3A viewed from another perspective. Referring to FIGS. 3A and 3B, a beam splitting element 200B of the embodiment and the beam splitting element 200 in FIG. 1C are similar. The major difference is that the splitting element 200B is not disposed on a wavelength conversion element 300B. In the embodiment, the first split beam SB1 is converted into the converted beam F through the wavelength conversion element 300B. The second split beam SB2 is transmitted to the light homogenization element 400 so that the illumination system 20 (shown in FIG. 1A) outputs the second color light in the illuminating beam I. The second split beam SB2 is transmitted to the light homogenization element 400 by, for example, guiding the second split beam SB2 to the light homogenization element 400 by disposing a reflector. In another embodiment, the second split beam SB2 may also be transmitted to another wavelength conversion element or any arbitrary light receiving element; however, the invention is not limited thereto. The advantages of the beam splitting element 200B of the embodiment or a projection device adopting the beam splitting element 200B are similar to the advantages of the beam splitting element 200 or the projection device 10 in FIG. 1A and will not be repeated here.

Figure 4A:
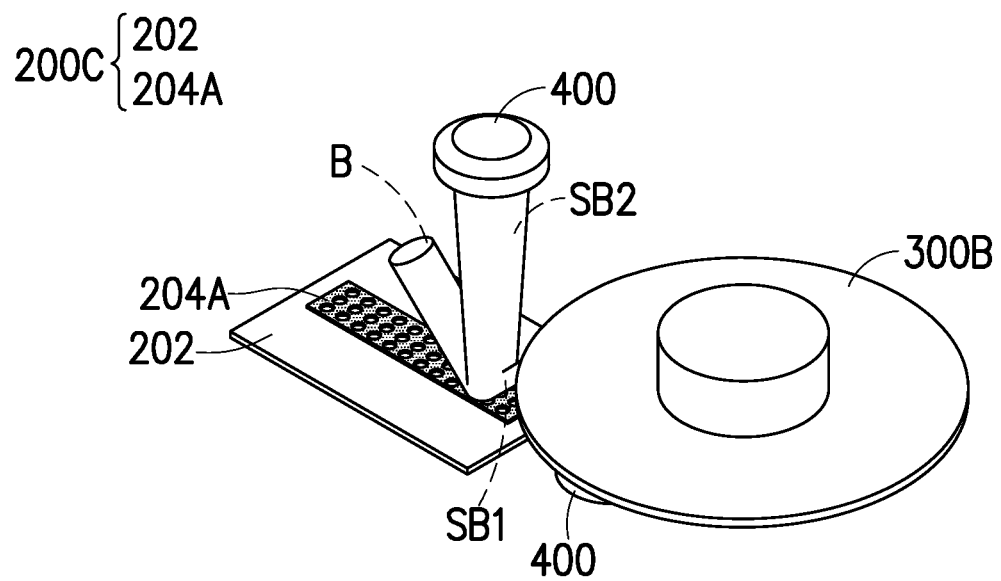
FIG. 4A is a schematic diagram of a wavelength conversion element and a beam splitting element according to a fourth embodiment of the invention.
Figure 4B:
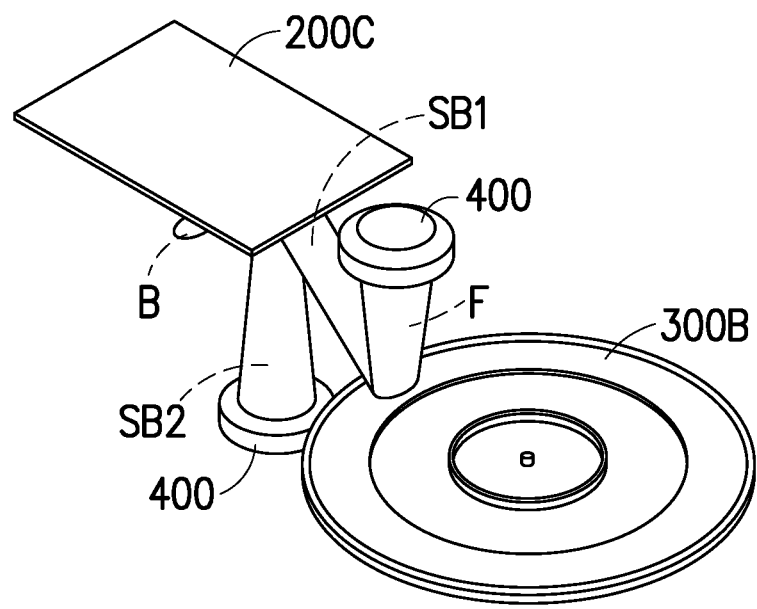
FIG. 4B is a schematic diagram of FIG. 4A viewed from another perspective.

FIG. 4A is a schematic diagram of a wavelength conversion element and a beam splitting element according to a fourth embodiment of the invention. FIG. 4B is a schematic diagram of FIG. 4A viewed from another perspective. Referring to FIGS. 4A and 4B, a beam splitting element 200C of the embodiment and the beam splitting element 200B in FIG. 3A are similar. The major difference is that in the embodiment, the diffuse reflection layer 204A of the beam splitting element 200C may be multiple regions which are separately distributed. Furthermore, in a light speckle range of the incident beam B incident to the beam splitting element 200C, a range of the first portion of the diffuse reflection layer 204A and a range of the second portion of the optical substrate 202 may be adjusted according to the actual use. The advantages of the beam splitting element 200C of the embodiment or a projection device adopting the beam splitting element 200C are similar to the advantages of the beam splitting element 200B in FIG. 3A or the projection device 10 in FIG. 1A and will not be repeated here.

Figure 5A:
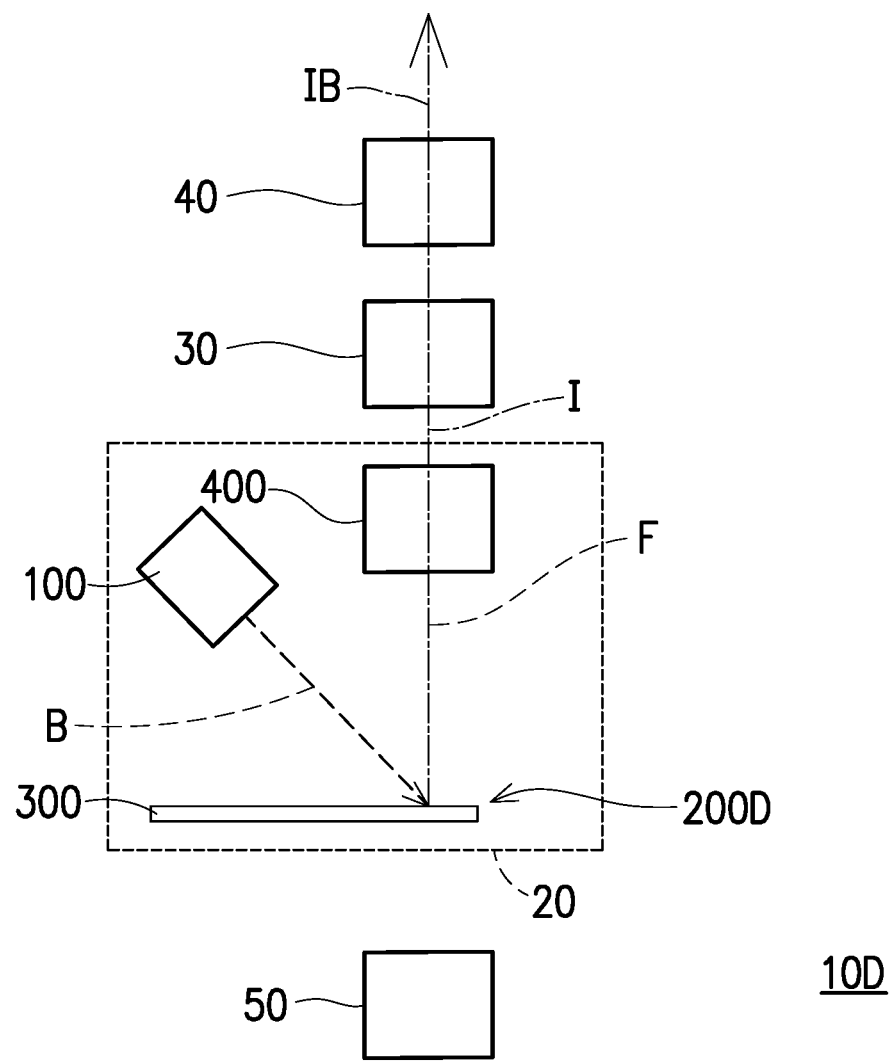
FIG. 5A is a schematic diagram of a light path of a projection device in a first timing according to a fifth embodiment of the invention.
Figure 5B:
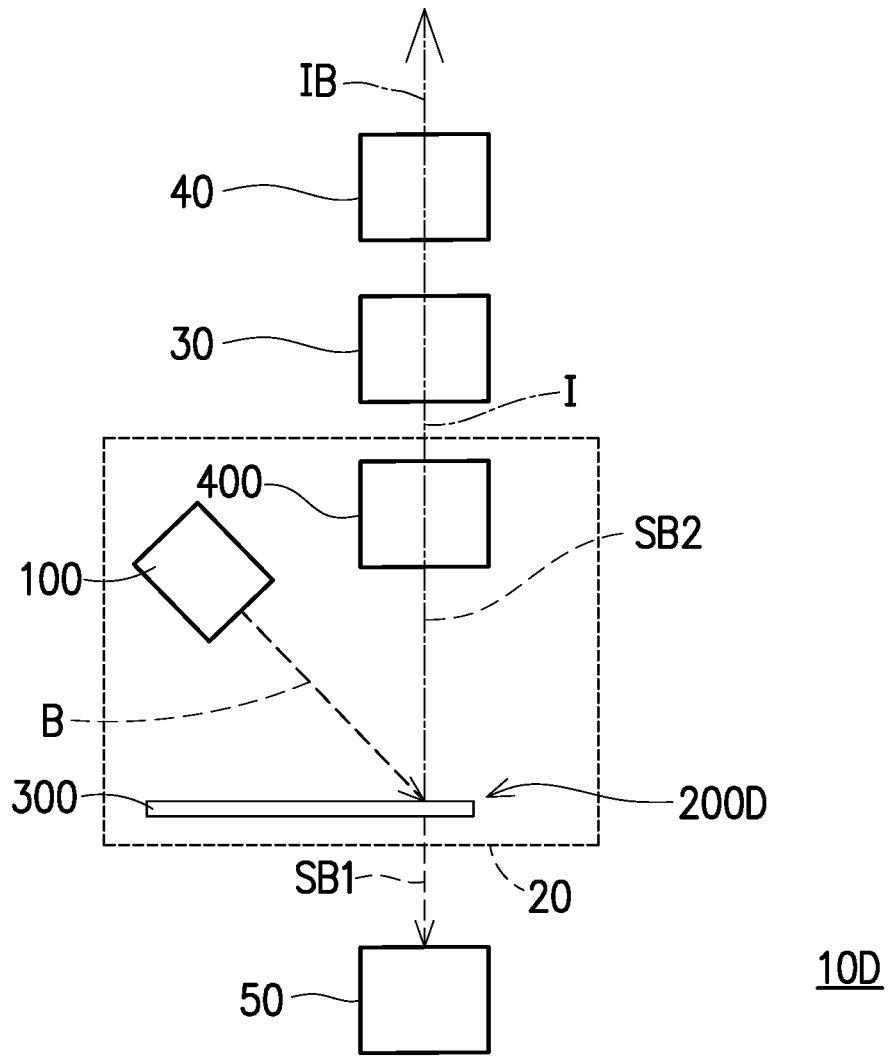
FIG. 5B is a schematic diagram of a light path of the projection device in a second timing according to a fifth embodiment of the invention.
Figure 5C:
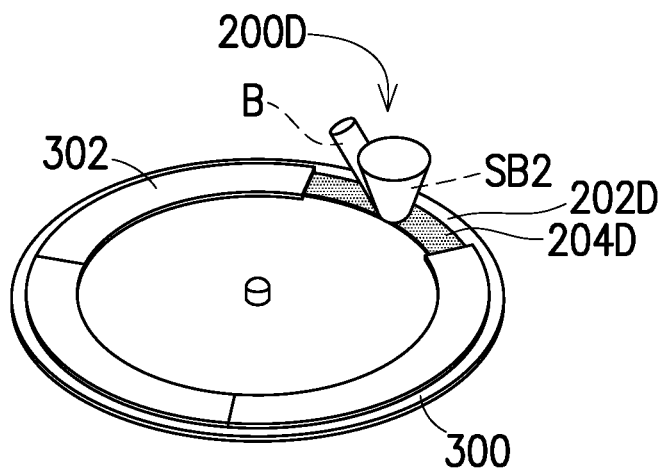
FIG. 5C is an enlarged schematic diagram of a wavelength conversion element and a beam splitting element in FIG. 5B.
Figure 5D:
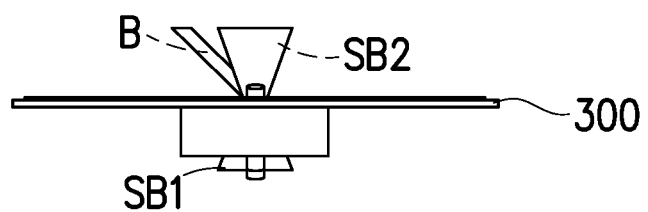
FIG. 5D is a schematic diagram of FIG. 5C viewed from another perspective.

FIG. 5A is a schematic diagram of a light path of a projection device in a first timing according to a fifth embodiment of the invention. FIG. 5B is a schematic diagram of a light path of a projection device in a second timing according to a fifth embodiment of the invention. FIG. 5C is an enlarged schematic diagram of a wavelength conversion element and a beam splitting element in FIG. 5B. FIG. 5D is a schematic diagram of FIG. 5C viewed from another perspective. Referring to FIGS. 5A to 5D, a beam splitting element 200D or a projection device 10D of the embodiment and the beam splitting element 200 in FIG. 1C or the projection device 10 in FIG. 1A are similar. The major difference is that an optical substrate 202D of the beam splitting element 200D is configured to allow the incident beam B to pass through. In addition, the field angles $\alpha 1$ and $\alpha 2$ after the first split beam SB1 and the second split beam SB2 exit from the beam splitting element 200D are the same, and the exit direction of the first split beam SB1 is opposite to the exit direction of the second split beam SB2. Furthermore, the exit directions of the first split beam SB1 and the second split beam SB2 are not parallel to an incident direction of the incident beam B.

Specifically, in the embodiment, the optical substrate 202D may be a transparent substrate, such as a substrate including glass, polymers, or ceramic. The first split beam SB1 passes through a diffuse reflection layer 204D and the optical substrate 202D, and the second split beam SB2 is reflected by the diffuse reflection layer 204D. The light intensity ratio of the first split beam SB1 to the second split beam SB2 is inversely proportional to a thickness of the diffuse reflection layer 204D. That is, a portion of the incident beam B absorbed by the diffuse reflection layer 204D forms the second split beam SB2 which is diffusely reflected, whereas the remaining of the incident beam B passes through the diffuse reflection layer 204D to form the first split beam SB1. Therefore, the light intensity ratio of the first split beam SB1 to the second split beam SB2 is determined by designing a thickness (e.g. in a range of 0.03 mm to 0.3 mm) of the diffuse reflection layer 204D. For example, after the incident beam B is split, the first split beam SB1 with 50% light intensity which diffusely passes through and the second split beam SB2 with 50% light intensity which is diffusely reflected are formed. In another embodiment, the light intensity ratio of the first split beam SB1 to the second split beam SB2 is inversely proportional to the thickness of the diffuse reflection layer 204D or a particle concentration (e.g. a reflection particle concentration at a volume ratio ranging from 20% to 95%) of the diffuse reflection layer 204D.

In the embodiment, the projection device further includes the optical system 50. The wavelength conversion element 300 includes the wavelength conversion layer 302 which is configured to generate the converted beam F. The beam splitting element 200D is disposed on the wavelength conversion element 300. The wavelength conversion layer 302 and the diffuse reflection layer 204D are connected to form a ring shape taking the center of the wavelength conversion element 300 as the circle center. Both of the wavelength conversion layer 302 and the diffuse reflection layer 204D are disposed on portions of a surface of the optical substrate 202D.

In a first timing of the embodiment, the wavelength conversion layer 302 cuts into the transmission path of the incident beam B. The incident beam B is converted into the converted beam F through the wavelength conversion element 300 so that the illumination system 20 outputs the first color light in the illuminating beam I.

In a second timing of the embodiment, the beam splitting element 200D cuts into the transmission path of the incident beam B. The second split beam SB2 enters the light homogenization element 400 so that the illumination system 20 outputs the second color light in the illuminating beam I. After passing through the beam splitting element 200D, the first split beam SB1 is transmitted to the optical system 50. The advantages of the beam splitting element 200D or the projection device 10D of the embodiment are similar to the advantages of the beam splitting element 200 and the projection device 10 in FIG. 1A and will not be repeated here.

Figure 6A:
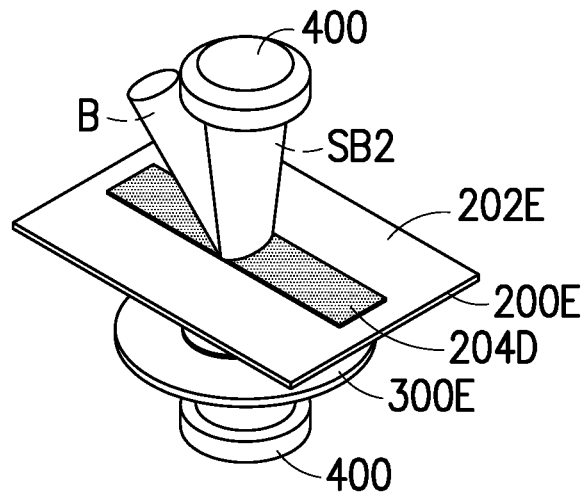
FIG. 6A is a schematic diagram of a wavelength conversion element and a beam splitting element according to a sixth embodiment of the invention.
Figure 6B:
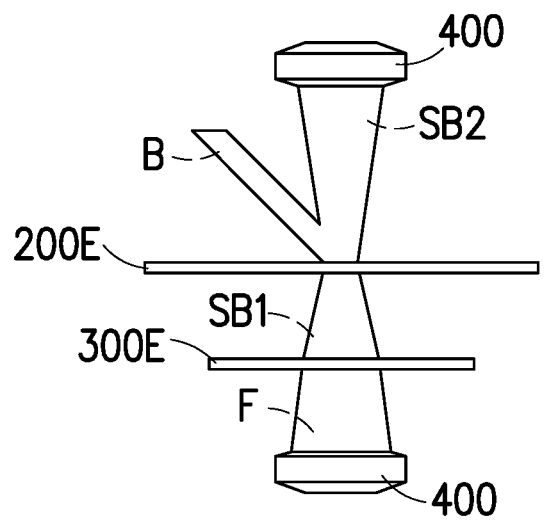
FIG. 6B is a schematic diagram of FIG. 6A viewed from another perspective.

FIG. 6A is a schematic diagram of a wavelength conversion element and a beam splitting element according to a sixth embodiment of the invention. FIG. 6B is a schematic diagram of FIG. 6A viewed from another perspective. Referring to FIGS. 6A and 6B, a beam splitting element 200E of the embodiment and the beam splitting element 200D in FIG. 5C are similar. The major difference is that the beam splitting element 200E is not disposed on a wavelength conversion element 300E, and an optical substrate 202E of the beam splitting element 200E and the wavelength conversion element 300E are parallel to each other. Therefore, after passing through the beam splitting element 200E, the incident beam B is split into the first split beam SB1 and the second split beam SB2. The first split beam SB1 is further converted into the converted beam F by the wavelength conversion element 300E. The second split beam SB2 is reflected to the light homogenization element 400 so that the illumination system 20 (shown in FIG. 5A) outputs the second color light in the illuminating beam I. The the second split beam SB2 is transmitted to the light homogenization element 400 by, for example, guiding the second split beam SB2 to the light homogenization element 400 by disposing a reflector; however, the invention is not limited thereto. The wavelength conversion element 300E may be a rotatable optical wheel or a motionless optical plate (e.g. a glass sheet). The advantages of the beam splitting element 200E of the embodiment or a projection device adopting the beam splitting element 200E are similar to the advantages of the beam splitting element 200D or the projection device 10D in FIG. 5A and will not be repeated here.

Figure 7A:
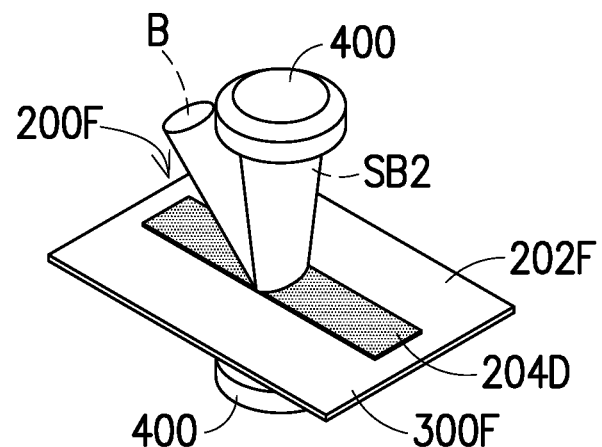
FIG. 7A is a schematic diagram of a wavelength conversion element and a beam splitting element according to a seventh embodiment of the invention.
Figure 7B:
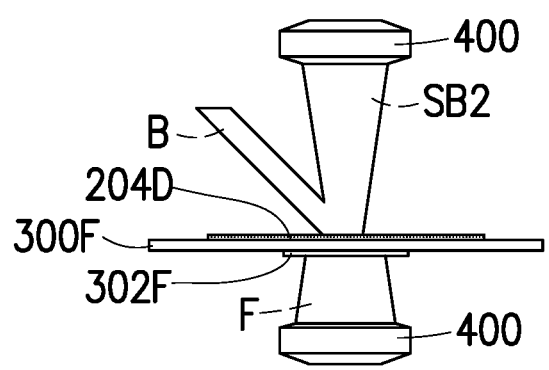
FIG. 7B is a schematic diagram of FIG. 7A viewed from another perspective.

FIG. 7A is a schematic diagram of a wavelength conversion element and a beam splitting element according to a seventh embodiment of the invention. FIG. 7B is a schematic diagram of FIG. 7A viewed from another perspective. Referring to FIGS. 7A and 7B, a beam splitting element 200F of the embodiment and the beam splitting element 200E in FIG. 6A are similar. The major difference is that in the embodiment, a wavelength conversion element 300F includes a wavelength conversion layer 302F which is configured to generate the converted beam F. The beam splitting element 200F is disposed on the wavelength conversion element 300F. In addition, the diffuse reflection layer 204D of the beam splitting element 200F and the wavelength conversion layer 302F are respectively disposed on opposite surfaces of an optical substrate 202F. Therefore, the beam splitting element 200F of the embodiment has a smaller volume, and a system volume of a projection device adopting the beam splitting element 200F can be further reduced. The rest of the advantages of the beam splitting element 200F of the embodiment or the projection device adopting the beam splitting element 200F are similar to the advantages of the beam splitting element 200E in FIG. 6A or the projection device adopting the beam splitting element 200E and will not be repeated here.

Figure 8A:
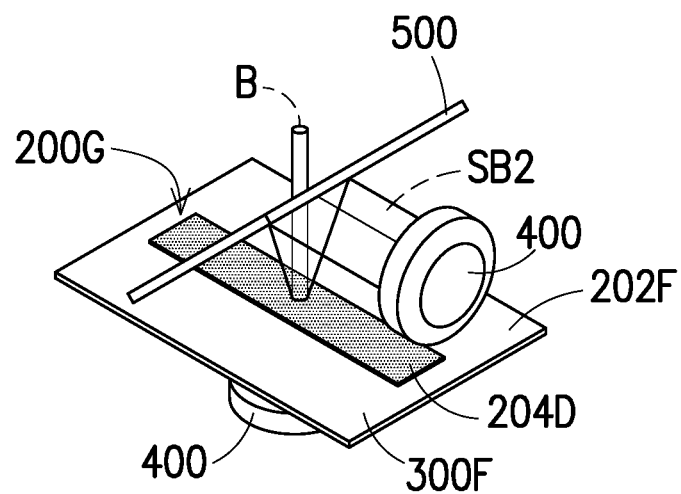
FIG. 8A is a schematic diagram of a wavelength conversion element and a beam splitting element according to an eighth embodiment of the invention.
Figure 8B:
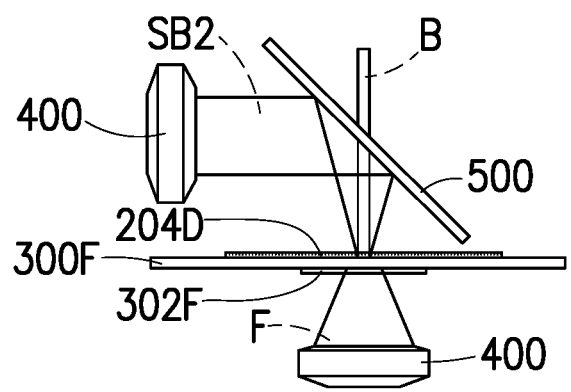
FIG. 8B is a schematic diagram of FIG. 8A viewed from another perspective.

FIG. 8A is a schematic diagram of a wavelength conversion element and a beam splitting element according to an eighth embodiment of the invention. FIG. 8B is a schematic diagram of FIG. 8A viewed from another perspective. Referring to FIGS. 8A and 8B, a beam splitting element 200G of the embodiment and the beam splitting element 200F in FIG. 7A are similar. The major difference is that in the embodiment, a projection device further includes a beam splitter 500. The beam splitter 500 is, for example, a reflection mirror having a through hole. The beam splitter 500 is disposed on the transmission path of the incident beam B. After passing through the through hole of the beam splitter 500, the incident beam B is transmitted to the beam splitting element 200G. After the second split beam SB2 (after being diffusely reflected by the diffuse reflection layer 204D) exits from the beam splitting element 200G, the second split beam SB2 is reflected to the light homogenization element 400 due to a reflective property of the beam splitter 500. The second split beam SB2 is transmitted to the light homogenization element 400 by, for example, guiding the second split beam SB2 to the light homogenization element 400 by disposing a reflector; however, the invention is not limited thereto. The advantages of the beam splitting element 200G of the embodiment or a projection device adopting the beam splitting element 200G are similar to the advantages of the beam splitting element 200F in FIG. 7A or the projection device adopting the beam splitting element 200F and will not be repeated here.

Figure 9A:
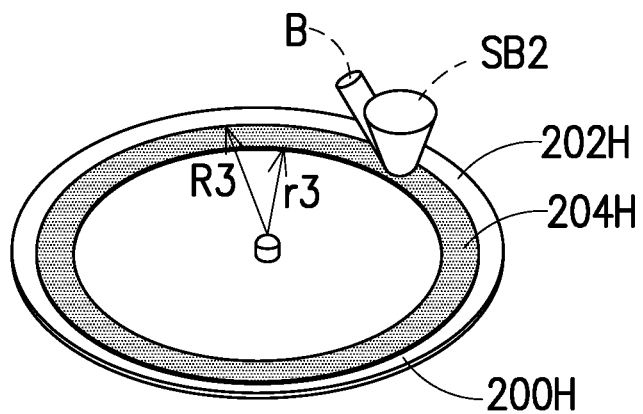
FIG. 9A is a schematic diagram of a wavelength conversion element and a beam splitting element according to a ninth embodiment of the invention.
Figure 9B:
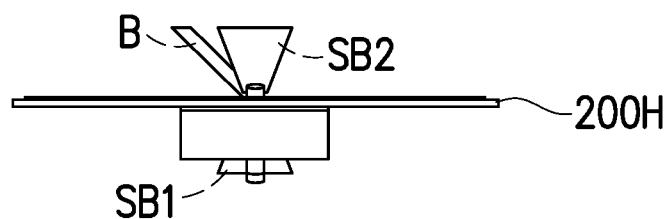
FIG. 9B is a schematic diagram of FIG. 9A viewed from another perspective.

FIG. 9A is a schematic diagram of a wavelength conversion element and a beam splitting element according to a ninth embodiment of the invention. FIG. 9B is a schematic diagram of FIG. 9A viewed from another perspective. Referring to FIGS. 9A and 9B, a beam splitting element 200H of the embodiment and the beam splitting element 200D in FIG. 5C are similar. The major difference is that in the embodiment, the beam splitting element 200H is an optical wheel. A diffuse reflection layer 204H of the beam splitting element 200H is in a ring shape taking a center of an optical substrate 202H as a circle center. A light speckle range of the incident beam B incident to the beam splitting element 200H is greater than a difference between an outer radius R3 and an inner radius r3 of the diffuse reflection layer 204H. The advantages of the beam splitting element 200H of the embodiment and a projection device adopting the beam splitting element 200H are similar to the advantages of the beam splitting element 200D and the projection device 10D in FIG. 5A and will not be repeated here.

In summary of the above, in the embodiments of the invention, the beam splitting element is designed to split a beam as desired by adjusting the ratio of the optical substrate to the diffuse reflection layer. Therefore, with the beam splitting element, the incident beam can be split as well as diffused. Hence, a manufacturing cost and a system space of the projection device can be effectively reduced. At the same time, additional optical elements such as a beam splitter or a diffuser are not required in the projection device adopting the beam splitting element. The light path of the illumination system can be simplified, and the diffuse reflection light effect also increases the uniformity of the projection image.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A beam splitting element, configured to split an incident beam incident to the beam splitting element, the beam splitting element comprising an optical substrate and a diffuse reflection layer, wherein:
   the optical substrate is a mirror reflection substrate and is configured to reflect the incident beam; and
   the diffuse reflection layer is disposed on a portion of a surface of the optical substrate,
   wherein the incident beam is split into a first split beam and a second split beam through the beam splitting element, wherein a light speckle range of the incident beam incident to the beam splitting element comprises a first portion falling on the diffuse reflection layer as well as a second portion falling on the optical substrate without the diffuse reflection layer so that the incident beam is correspondingly split into the first split beam and the second split beam, and the first split beam and the second split beam satisfies one of a plurality of following conditions:
   a field angle of the first split beam and a field angle of the second split beam exit from the beam splitting element are different; and
   the field angle of the first split beam and the field angle of the second split beam exit from the beam splitting element are the same, and an exit direction of the first split beam and an exit direction of the second split beam are parallel to each other.

2. The beam splitting element according to claim 1, wherein a light intensity ratio of the first split beam to the second split beam is proportional to a ratio of the first part to the second part.

3. The beam splitting element according to claim 1, wherein the diffuse reflection layer comprises a plurality of separately distributed regions.

4. A beam splitting element, configured to split an incident beam incident to the beam splitting element, the beam splitting element comprising an optical substrate and a diffuse reflection layer,
   wherein the optical substrate is a transparent substrate and is configured to allow the incident beam to pass through, and the diffuse reflection layer is disposed on a portion of a surface of the optical substrate,
   wherein the incident beam is split into a first split beam and a second split beam through the beam splitting element, an exit direction of the first split beam is opposite to an exit direction of the second split beam, wherein the first split beam and the second split beam satisfies one of a plurality of following conditions:
   a field angle of the first split beam and a field angle of the second split beam exit from the beam splitting element are different; and
   the field angle of the first split beam and the field angle of the second split beam exit from the beam splitting element are the same.

5. A projection device, comprising an illumination system, a light valve, and a projection lens, wherein the illumination system is configured to provide an illuminating beam, the light valve is disposed on a transmission path of the illuminating beam and is configured to convert the illuminating beam into an image beam, the projection lens is disposed on a transmission path of the image beam and is configured to project the image beam out of the projection device, wherein the illumination system comprises a light source, a beam splitting element, a wavelength conversion element, and a light homogenization element, wherein:
- the light source is configured to emit an incident beam;
- the beam splitting element comprises an optical substrate and a diffuse reflection layer, wherein:
  - the optical substrate is configured to reflect or allow the incident beam to pass through; and
  - the diffuse reflection layer is disposed on a portion of a surface of the optical substrate;
- wherein the incident beam is split into a first split beam and a second split beam through the beam splitting element and satisfies one of a plurality of following conditions:
  - a field angle of the first split beam and a field angle of the second split beam exit from the beam splitting element are different; and
  - the field angle of the first split beam and the field angle of the second split beam exit from the beam splitting element are the same, and an exit direction of the first split beam and an exit direction of the second split beam are parallel to each other; and
- the first split beam or the incident beam is converted into a converted beam through the wavelength conversion element and then enters the light homogenization element so that the illumination system outputs a first color light in the illuminating beam.

6. The projection device according to claim 5, wherein the optical substrate is a mirror reflection substrate.

7. The projection device according to claim 6, wherein the wavelength conversion element comprises a wavelength conversion layer configured to generate the converted beam, the beam splitting element is disposed on the wavelength conversion element, and
the wavelength conversion layer and the diffuse reflection layer are connected to form a ring shape taking a center of the wavelength conversion element as a circle center, a difference between an outer radius and an inner radius of the wavelength conversion layer is greater than a difference between an outer radius and an inner radius of the diffuse reflection layer.

8. The projection device according to claim 7, further comprising an optical system, wherein:
in a first timing, the wavelength conversion layer cuts into a transmission path of the incident beam, the incident beam is converted into the converted beam through the wavelength conversion element so that the illumination system outputs the first color light in the illuminating beam; and
in a second timing, the beam splitting element cuts into the transmission path of the incident beam, the first split beam enters the light homogenization element so that the illumination system outputs a second color light in the illuminating beam, and the second split beam is transmitted to the optical system.

9. The projection device according to claim 6, wherein a light speckle range of the incident beam incident to the beam splitting element comprises a first portion falling on the diffuse reflection layer as well as a second portion falling on the optical substrate without the diffuse reflection layer so that the incident beam is correspondingly split into the first split beam and the second split beam.

10. The projection device according to claim 9, wherein a light intensity ratio of the first split beam to the second split beam is proportional to a ratio of the first portion to the second portion.

11. The projection device according to claim 6, wherein the exit direction of the first split beam and the exit direction of the second split beam from the beam splitting element are different.

12. The projection device according to claim 9, wherein the diffuse reflection layer comprises a plurality of separately distributed regions.

13. The projection device according to claim 6, wherein the first split beam is converted into the converted beam through the wavelength conversion element, the second split beam is transmitted to the light homogenization element so that the illumination system outputs a second color light in the illuminating beam.

14. The projection device according to claim 5, wherein the optical substrate is a transparent substrate,
the first split beam passes through the diffuse reflection layer and the optical substrate, and the second split beam is reflected by the diffuse reflection layer, and
a light intensity ratio of the first split beam to the second split beam is inversely proportional to a thickness of the diffuse reflection layer.

15. The projection device according to claim 14, wherein after passing through the beam splitting element, the first split beam is converted into the converted beam by the wavelength conversion element, the second split beam is reflected to the light homogenization element so that the illumination system outputs a second color light in the illuminating beam.

16. The projection device according to claim 15, wherein the wavelength conversion element comprises a wavelength conversion layer configured to generate the converted beam, wherein:
the beam splitting element is disposed on the wavelength conversion element; and
the diffuse reflection layer and the wavelength conversion layer are respectively disposed on opposite surfaces of the optical substrate.

17. The projection device according to claim 14, further comprising an optical system, wherein the wavelength conversion element comprises a wavelength conversion layer configured to generate the converted beam, wherein:
the beam splitting element is disposed on the wavelength conversion element;
the wavelength conversion layer and the diffuse reflection layer are connected to form a ring shape taking a center of the wavelength conversion element as a circle center;
in a first timing, the wavelength conversion layer cuts into a transmission path of the incident beam, the incident beam is converted into the converted beam through the wavelength conversion element so that the illumination system outputs the first color light in the illuminating beam; and
in a second timing, the beam splitting element cuts into the transmission path of the incident beam, the second split beam enters the light homogenization element so that the illumination system outputs a second color light in the illuminating beam, and the first split beam is transmitted to the optical system after passing through the beam splitting element.

18. The projection device according to claim 14, wherein the beam splitting element is an optical wheel, the diffuse reflection layer is in a ring shape taking a center of the optical substrate as a circle center, a light speckle range of the incident beam incident to the beam splitting element is greater than a difference between an outer radius and an inner radius of the diffuse reflection layer.

19. The projection device according to claim 16, further comprising a beam splitter disposed on a transmission path of the incident beam, wherein:
  after passing through the beam splitter, the incident beam is transmitted to the beam splitting element; and
  after exiting from the beam splitting element, the second split beam is reflected to the light homogenization element by the beam splitter.

* * * * *